(12) United States Patent
Takahashi et al.

(10) Patent No.: US 12,232,052 B2
(45) Date of Patent: Feb. 18, 2025

(54) TERMINAL AND COMMUNICATION METHOD

(71) Applicant: NTT DOCOMO, INC., Tokyo (JP)

(72) Inventors: Hideaki Takahashi, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 376 days.

(21) Appl. No.: 17/754,273

(22) PCT Filed: Oct. 2, 2019

(86) PCT No.: PCT/JP2019/039024
§ 371 (c)(1),
(2) Date: Mar. 29, 2022

(87) PCT Pub. No.: WO2021/064928
PCT Pub. Date: Apr. 8, 2021

(65) Prior Publication Data
US 2022/0330179 A1    Oct. 13, 2022

(51) Int. Cl.
*H04B 7/00* (2006.01)
*H04W 52/24* (2009.01)
*H04W 52/36* (2009.01)
*H04W 72/044* (2023.01)

(52) U.S. Cl.
CPC ....... *H04W 52/367* (2013.01); *H04W 52/241* (2013.01); *H04W 72/0473* (2013.01)

(58) Field of Classification Search
CPC ........... H04W 52/0209; H04W 52/416; H04W 52/367; H04W 52/241; H04W 72/0473
See application file for complete search history.

(56) References Cited

U.S. PATENT DOCUMENTS

| | | |
|---|---|---|
| 2016/0112971 A1 | 4/2016 | Dinan |
| 2017/0142668 A1 | 5/2017 | Takeda et al. |
| 2017/0208555 A1* | 7/2017 | Takahashi ............. H04W 48/12 |

FOREIGN PATENT DOCUMENTS

WO     2018/064977 A1    4/2018

OTHER PUBLICATIONS

Extended European Search Report issued in counterpart European Application No. 19947467.7 mailed on May 24, 2023 (7 pages).
Ericsson; "NR-DC power control"; 3GPP TSG-RAN WG2 #107, R2-1910242; Prague, Czech Republic; Aug. 26-30, 2019 (4 pages).
3GPP TS 38.211 V15.0.0; "3rd Generation Partnership Project; Technical Specification Group Radio Access Network; NR; Physical channels and modulation (Release 15)"; Dec. 2017 (73 pages).
International Search Report for corresponding International Application No. PCT/JP2019/039024, mailed Apr. 14, 2020 (3 pages).

(Continued)

*Primary Examiner* — Tuan Pham
(74) *Attorney, Agent, or Firm* — Osha Bergman Watanabe & Burton LLP

(57) ABSTRACT

A terminal includes a receiving unit that receives P-Max that is configuration information of maximum transmit power in a cell in Frequency Range 2 (FR2) among Frequency Range 1 (FR1) and the FR2; and a control unit that performs, when the P-Max of the cell in the FR2 is not supported, an operation of ignoring the P-Max of the cell in the FR2 or an operation of considering the cell in the FR2 as a barred cell.

6 Claims, 18 Drawing Sheets

(56) References Cited

OTHER PUBLICATIONS

Written Opinion for corresponding International Application No. PCT/JP2019/039024, mailed Apr. 14, 2020 (3 pages).
Office Action issued in counterpart Colombian Patent Application No. NC2022/0003047 mailed on Oct. 18, 2024 (16 pages).
Office Action issued in counterpart African Patent Application No. AP/P/2022/013921 mailed on Oct. 11, 2024 (4 pages).
Office Action issued in counterpart Indian Patent Application No. 202217021024 mailed on Sep. 25, 2024 (7 pages).

* cited by examiner

DIGITAL BEAM FORMING

ANALOG BEAM FORMING

Phase shifters

HYBRID BEAM FORMING

FIG.7

6.2.1 UE maximum output power

The following UE Power Classes define the maximum output power radiated by the UE for any transmission bandwidth within the channel bandwidth for non-CA configuration, unless otherwise stated. The period of measurement shall be at least one sub frame (1ms). The values listed on the table below are for handheld UE, defined as minimum peak EIRP, maximum allowed EIRP and TRP. The max allowed EIRP is derived from regulatory requirements [8].

Table 6.2.1-1: NR FR2 UE Power Class

| NR band | UE type | Power Class Min Peak EIRP (dBm) | Spherical coverage CDF percentile | Spherical coverage EIRP at the % (dBm) | Maximum allowed EIRP (dBm) | Maximum allowed TRP (dBm) |
|---|---|---|---|---|---|---|
| n257 | Handheld | [21.2-25.2] (default) 26 | 20 | 18 | 43 | 23 |
|  | FWA | 36 (default) 26 | 20 95 | 21 35 | 43 55 | 26 26 |
| n258 |  | [21.2-25.2] |  | 25 | 43 | 23 |
| n260 |  | [19.4-23.7] |  |  |  |  |
| NOTE 1: | minimum peak EIRP is defined as the lower limit without tolerance | | | | | |

FIG.8

6.2.1 UE maximum output power

The following UE Power Classes define the maximum output power radiated by the UE for any transmission bandwidth within the channel bandwidth for non-CA configuration, unless otherwise stated. The period of measurement shall be at least one sub frame (1ms). The values listed on the table below are for handheld UE, defined as minimum peak EIRP, maximum allowed EIRP and TRP. The max allowed EIRP is derived from regulatory requirements [8].

Table 6.2.1-1: NR FR2 UE Power Class

| NR band | Power Class Min Peak EIRP (dBm) | Spherical class | Maximum allowed EIRP (dBm) | Maximum allowed TRP (dBm) |
|---|---|---|---|---|
| n257 | [21.2-25.2] | 1 | 43 | 23 |
|  | 36.0 | 2 | 43 | 23 |
| n258 | [21.2-25.2] | 3 | 55 | 26 |
| n260 | [19.4-23.7] |  |  |  |

NOTE 1: minimum peak EIRP is defined as the lower limit without tolerance

Table 6.2.1-2: NR FR2 Spherical Class

| Spherical Class | CDF percentile (%) | EIRP at the % (dBm) |
|---|---|---|
| 1 | 20 | 15 |
| 2 | 50 | 25 |
| 3 | 95 | 35 |

FIG. 9

| $P_{EMAX, MR-DC}$ | Maximum allowed UE output power while the UE is configured with MR-DC signalled by higher layers. Same as IE *P-Max-MRDC*, defined in TS 38.331 [x]. |

The default power class $P_{PowerClass\_Default, EN-DC}$ for a DC configuration is Power Class 3 unless otherwise stated.

$$P_{CMAX\_L}(p,q) \leq P_{CMAX}(p,q) \leq P_{CMAX\_H}(p,q)$$

with
$P_{CMAX\_L}(p,q) = \text{MIN} \{10 \log_{10} [P_{CMAX\_L,c,E-UTRA}(p) + P_{CMAX\_L,c,NR}(q)], P_{PowerClass, EN-DC} - \Delta P_{PowerClass, EN-DC}, P_{EMAX, EN-DC}\}$
$P_{CMAX\_H}(p,q) = \text{MIN} \{10 \log_{10} [P_{CMAX\_H,c,E-UTRA}(p) + P_{CMAX\_H,c,NR}(q)], P_{PowerClass, EN-DC} - \Delta P_{PowerClass, EN-DC}, P_{EMAX, EN-DC}\}$
where
$P_{CMAX\_L,c,E-UTRA}(p)$, $P_{CMAX\_H,c,E-UTRA}(p)$, $P_{CMAX\_L,c,NR}(q)$, and $P_{CMAX\_H,c,NR}(q)$ are their respective high and low limits expressed in linear scale;
$P_{PowerClass, EN-DC}$ is defined in sub-clause 6.2.2.1 for intra-band EN-DC and 6.2.2.2 for inter-band EN-DC respectively;
For a power class higher than default UE power class capable UE, $\Delta P_{PowerClass, EN-DC} = P_{PowerClass, EN-DC} - P_{PowerClass\_Default, EN-DC}$ dB, when $P_{EMAX, EN-DC}$ is not indicated in the cell; or $P_{EMAX, EN-DC}$ is provided and set to the maximum output power of the default power class or lower, otherwise, $\Delta P_{PowerClass, EN-DC} = 0$ dB.

FIG.10

| SIB2 field descriptions |
|---|
| *p-Max*<br>Value in dBm applicable for the intra-frequency neighbouring NR cells. If absent the UE applies the maximum power according to TS 38.101-1 [15]. In this release of the specification, if p-Max is present on an FR2 cell, the UE shall ignore this field and consider as absent (and then applies the maximum power according to TS 38.101-1 [15]). |

FIG.11

| SIB4 field descriptions |
|---|
| *p-Max* Value in dBm applicable for the intra-frequency neighbouring NR cells. If absent the UE applies the maximum power according to TS 38.101-1 [15]. In this release of the specification, if p-Max is present on an FR2 cell, the UE shall ignore this field and consider as absent (and then applies the maximum power according to TS 38.101-1 [15]). |

FIG.12

*FrequencyInfoUL-SIB field descriptions* p-Max
Value in dBm applicable for the intra-frequency neighbouring NR cells. If absent the UE applies the maximum power according to TS 38.101-1 [15]. In this release of the specification, if p-Max is present on an FR2 cell, the UE shall ignore this field and consider as absent (and then applies the maximum power according to TS 38.101-1 [15]).

FIG.13

- *P-Max*
  The IE *P-Max* is used to limit the UE's uplink transmission power on a carrier frequency, in TS 38.101-1 [15] and is used to calculate the parameter *Pcompensation* defined in TS 38.304 [20]. In this release of the specification, if p-Max is present on an FR2 cell, the UE shall ignore this field and consider as absent (and then applies the maximum power according to TS 38.101-1 [15]).

FIG. 14

| SIB2 field descriptions |
|---|
| *p-Max* Value in dBm applicable for the intra-frequency neighbouring NR cells. If absent the UE applies the maximum power according to TS 38.101-1 [15]. In this release of the specification, if p-Max is present on an FR2 cell, the UE shall consider the cell as barred. |

FIG. 15

| SIB4 field descriptions |
|---|
| *p-Max* Value in dBm applicable for the intra-frequency neighbouring NR cells. If absent the UE applies the maximum power according to TS 38.101-1 [15]. In this release of the specification, if p-Max is present on an FR2 cell, the UE shall consider the cell as barred. |

FIG. 16

| Frequency/nfoUL-SIB field descriptions | |
|---|---|
| p-Max | Value in dBm applicable for the intra-frequency neighbouring NR cells. If absent the UE applies the maximum power according to TS 38.101-1 [15]. }. In this release of the specification, if p-Max is present on an FR2 cell, the UE shall consider the cell as barred. |

FIG. 17

- *P-Max*
  The IE *P-Max* is used to limit the UE's uplink transmission power on a carrier frequency, in TS 38.101-1 [15] and is used to calculate the parameter *Pcompensation* defined in TS 38.304 [20].]. <u>In this release of the specification, if p-Max is present on an FR2 cell, the UE shall consider the cell as barred.</u>

TERMINAL AND COMMUNICATION METHOD

TECHNICAL FIELD

The present invention relates to a terminal and a communication method in a radio communication system.

BACKGROUND ART

In 3rd Generation Partnership Project (3GPP), in order to achieve larger system capacity, a higher data transmission rate, and further reduction of latency in a radio section, or the like, a radio communication system called 5G or New Radio (NR) (the radio communication system is referred to as "NR" below) has been studied. In NR, in order to meet the requirement that the latency in a radio section is reduced to be less than or equal to 1 ms, while achieving a transmission rate of greater than or equal to 10 Gbps, various radio technologies have been studied.

In NR, a radio communication using a millimeter wave has been studied, and use of a wide frequency range up to a frequency band that is higher than that of Long Term Evolution (LTE) has been assumed. Especially, since a propagation loss increases in a high frequency band, in order to compensate for the propagation loss, application of beam forming with a narrow beam width has been studied (e.g., Non-Patent Document 1).

RELATED ART DOCUMENT

Non-Patent Document

Non-Patent Document 1: 3GPP TS 38.211 V15.0.0 (2017-12)

SUMMARY OF THE INVENTION

Problem to be Solved by the Invention

P_MAX is maximum transmit power specified for each cell. Introduction of P_MAX in FR2 is currently being studied in a 3GPP meeting. In 3GPP release 15, it is assumed that P_MAX will not be introduced in FR2. In contrast to this, there is a possibility that P_MAX will be introduced in FR2 in 3GPP release 16.

There is a need for a method that allows a terminal to properly operate when P_MAX is not introduced in FR2 in an old technical specification and P_MAX is introduced in FR2 in an updated technical specification in accordance with update of the technical specification, and when P_MAX in FR2 is indicated to the terminal that supports a function of the old technical specification and that does not support a function of the updated technical specification.

Means for Solving the Problem

According to an aspect of the present invention, there is provided a terminal including a receiving unit that receives P-Max that is configuration information of maximum transmit power in a cell in Frequency Range 2 (FR2) among Frequency Range 1 (FR1) and the FR2; and a control unit that performs, when the P-Max of the cell in the FR2 is not supported, an operation of ignoring the P-Max of the cell in the FR2 or an operation of considering the cell in the FR2 as a barred cell.

Advantage of the Invention

According to an embodiment, a method is provided that allows a terminal to properly operate when P_MAX is not introduced in FR2 in an old technical specification and P_MAX is introduced in FR2 in an updated technical specification in accordance with update of the technical specification, and when P_MAX in FR2 is indicated to the terminal that supports a function of the old technical specification and that does not support a function of the updated technical specification.

BRIEF DESCRIPTION OF DRAWINGS

FIG. 7 is an example (1) of a modification of a technical specification according to an embodiment of the present invention;

FIG. 8 is an example (2) of a modification of a technical specification according to an embodiment of the present invention;

FIG. 9 is an example (3) of a modification of a technical specification according to an embodiment of the present invention;

FIG. 10 is an example (4) of a modification of a technical specification according to an embodiment of the present invention;

FIG. 11 is an example (5) of a modification of a technical specification according to an embodiment of the present invention;

FIG. 12 is an example (6) of a modification of a technical specification according to an embodiment of the present invention;

FIG. 13 is an example (7) of a modification of a technical specification according to an embodiment of the present invention;

FIG. 14 is an example (8) of a modification of a technical specification according to an embodiment of the present invention;

FIG. 15 is an example (9) of a modification of a technical specification according to an embodiment of the present invention;

FIG. 16 is an example (10) of a modification of a technical specification according to an embodiment of the present invention;

FIG. 17 is an example (11) of a modification of a technical specification according to an embodiment of the present invention;

EMBODIMENTS OF THE INVENTION

Figure 1:
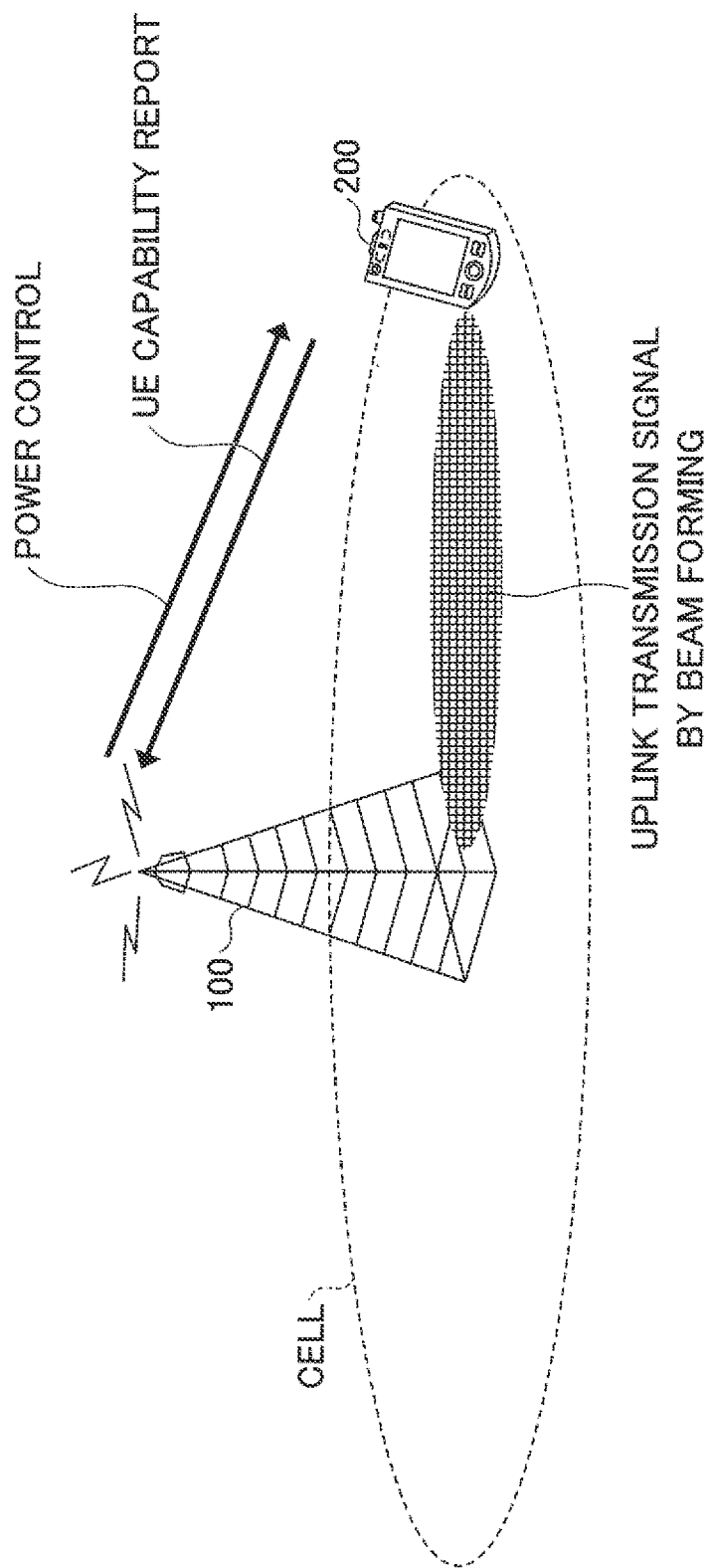
FIG. 1 is a diagram illustrating an example of a configuration of a radio communication system according to an embodiment of the present invention.

In the following, embodiments of the present invention are described with reference to the drawings. Note that the embodiments described below are examples, and embodiments to which the present invention is applied are not limited to the embodiments described below.

As for an operation of a radio communication system according to an embodiment of the present invention, existing technologies is used as appropriate. The existing technology is, for example, existing LTE. However, the existing technology is not limited to the existing LTE. Furthermore, "LTE" used in the present technical specification has broad meaning including LTE-Advanced and a scheme subsequent to LTE-Advanced (e.g., NR or 5G), unless as otherwise specified.

In the embodiments of the present invention described below, terms used in the existing LTE, such as a Synchronization Signal (SS), a Primary SS (PSS), a Secondary SS (SSS), a Physical broadcast channel (PBCH), and a Physical RACH (PRACH) are used. These are for convenience of the description, and signals, functions, or the like, similar to these may be referred to by different names.

In embodiments of the present invention, a duplex method may be a Time Division Duplex (TDD) method, a Frequency Division Duplex (FDD) method, or any other method (e.g., Flexible Duplex).

In the following description, to transmit a signal using a transmitting beam may be transmitting a signal to which a precoding vector is multiplied (precoded with the precoding vector). Similarly, receiving a signal using a received beam may be multiplying a received signal by a predetermined weight vector. Furthermore, transmitting a signal using a transmitting beam may be transmitting the signal through a specific antenna port. Similarly, receiving a signal using a reception beam may be receiving a signal through a specific antenna port. An antenna port refers to a logical antenna port or a physical antenna port defined in the 3GPP standard.

The method of forming a transmitting beam and a receiving beam is not limited to the above-described method. For example, in a base station apparatus 100 or a terminal 200 with multiple antennas, a method of changing an angle of each antenna may be used, a method may be used in which a method of using a precoding vector and a method of changing an angle of an antenna are combined, a method of switching different antenna panels may be used, a method of combining multiple antenna panels may be used, or other methods may be used. A plurality of mutually different transmitting beams may also be used, for example, in a high frequency band. The use of multiple transmitting beams is called multi-beam operation, and the use of a single transmitting beam is called single-beam operation.

Furthermore, in the embodiments of the present invention, to "configure" a radio parameter, or the like, may be to preconfigure or to specify a predetermined value, or to configure the radio parameter transmitted from the base station apparatus 100 or the terminal 200.

FIG. 1 is a diagram illustrating an example of a configuration of a radio communication system according to an embodiment of the present invention. The radio communication system in the embodiment of the present invention includes a base station apparatus 100 and a terminal 200, as illustrated in FIG. 1. In FIG. 1, one base station apparatus 100 and one terminal 200 are illustrated. However, this is an example, and there may be a plurality of base station apparatus 100 and a plurality of terminals 200.

The base station apparatus 100 is a communication device that provides one or more cells and that performs radio communication with the terminal 200. As illustrated in FIG. 1, the base station apparatus 100 transmits information on power control of the terminal 200 to the terminal 200. The information on the power control is, for example, a TPC command (Transmission Power Control command) transmitted by DCI (Downlink Control Information). By the TPC command, an absolute value or an accumulated value of the transmit power of PUSCH (Physical Uplink Shared Channel) is transmitted to the terminal 200.

As illustrated in FIG. 1, the terminal 200 transmits a UE capability report to the base station apparatus 100. A UE capability report is, for example, a power class (PC) of transmit power. The terminal 200 reports to the base station apparatus 100 as to which power class the terminal 200 corresponds to. Furthermore, as illustrated in FIG. 1, the terminal 200 transmits an uplink transmission signal by beam forming in which the transmission power control corresponding to the power class is applied to the base station apparatus 100.

Figure 2:
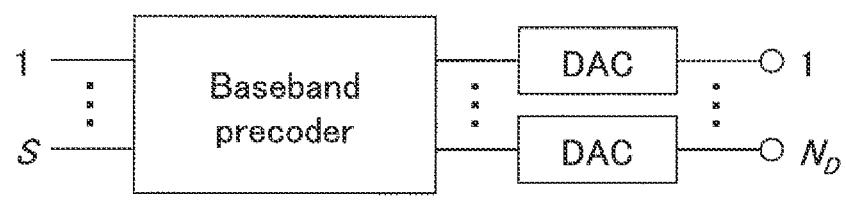
FIG. 2 is a diagram illustrating an example of a configuration of a circuit that performs digital beam forming.

FIG. 2 is a diagram illustrating an example of a configuration of a circuit for performing digital beam forming. As a method for implementing beam forming, digital beam forming has been studied such that, as illustrated in FIG. 2, Digital-to-Analog Converters (DACs) are included, where a number of the DACs is equal to a number of transmission antenna elements, and that baseband signal processing for precoding is performed for a number of times equal to the number of the transmission antenna elements.

Figure 3:
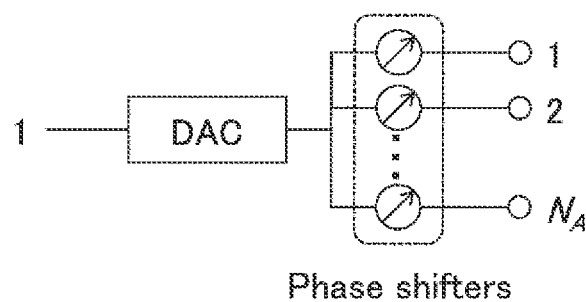
FIG. 3 is a diagram illustrating an example of a configuration of a circuit that performs analog beam forming.

FIG. 3 is a diagram illustrating an example of a configuration of a circuit for performing analog beam forming. As illustrated in FIG. 3, a method for implementing analog beam forming, analog beam forming has been studied such that beam forming is implemented using variable phase shifters in a Radio Frequency (RF) circuit, subsequent to converting a transmission signal into an analog signal using a DAC.

Figure 4:
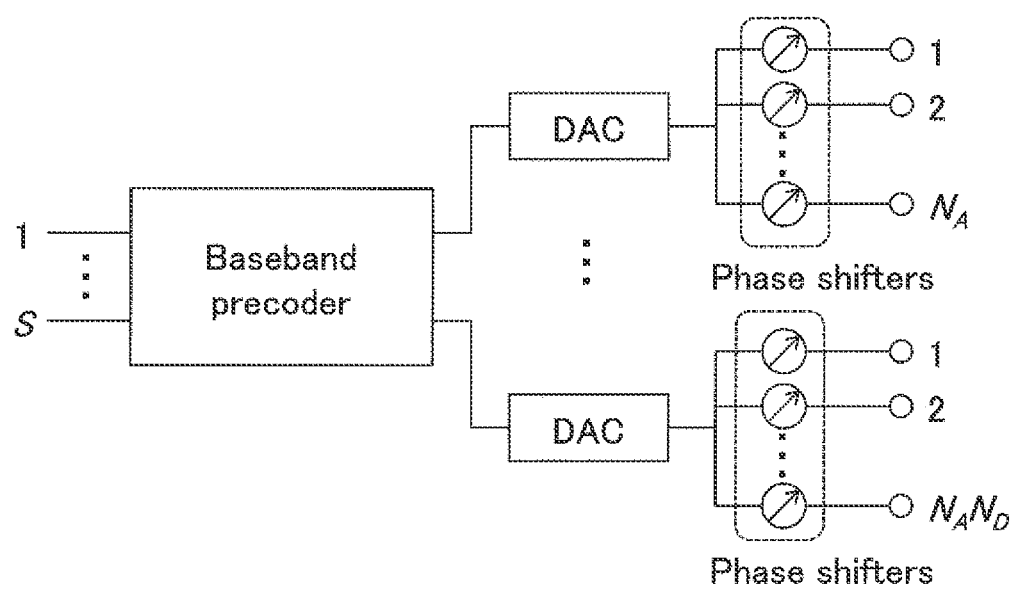
FIG. 4 is a diagram illustrating an example of a configuration of a circuit that performs hybrid beam forming.

FIG. 4 is a diagram illustrating an example of a configuration of a circuit for performing hybrid beam forming. As illustrated in FIG. 4, hybrid beam forming has been studied such that beam forming processing is implemented by both baseband signal processing for precoding and phase shifters in an RF circuit by combining digital beam forming and analog beam forming.

Figure 5:
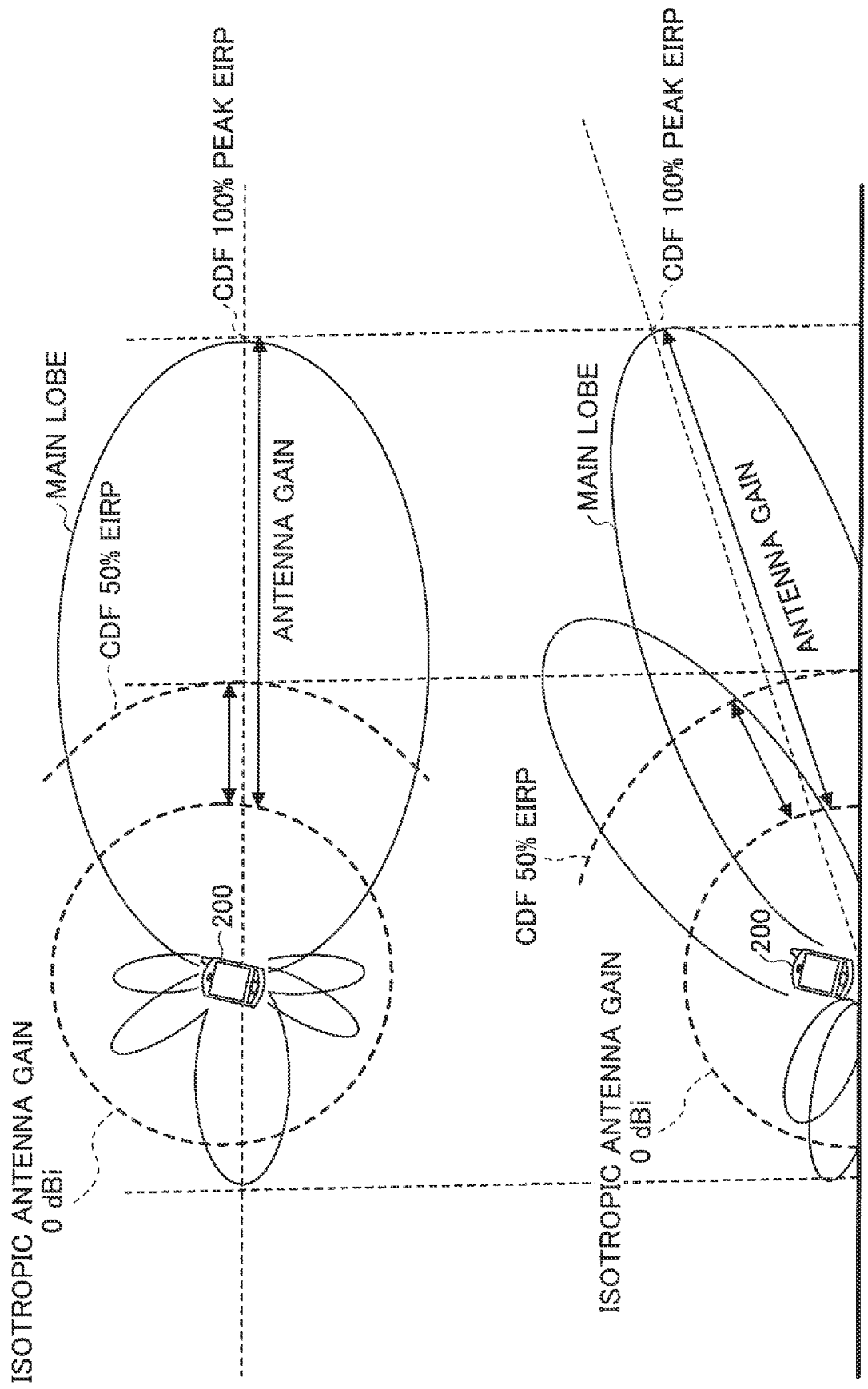
FIG. 5 is a diagram illustrating EIRP and CDF at beam forming according to an embodiment of the invention.

FIG. 5 is a diagram illustrating EIRP and CDF at beam forming in an embodiment of the present invention. FIG. 5 schematically illustrates the antenna characteristics of the terminal 200 at beam forming. As shown in FIG. 5, the antenna characteristics of the terminal 200 during beam forming have directivity.

The upper part of FIG. 5 shows the antenna characteristics in a horizontal plane, and a main lobe corresponding to the maximum radiation and other side lobes are shown. As illustrated in FIG. 5, since the antenna is provided with directivity, gain significantly varies depending on a radiation angle. The distance from a dotted line representing isotropic antenna gain of 0 dBi to a maximum radiation of the main lobe is the antenna gain of the directivity antenna of the terminal 200.

The lower part of FIG. 5 shows the antenna characteristics in a vertical plane, and a main lobe corresponding to the maximum radiation and other side lobes are shown. A hemispherical vertical surface is displayed because the terminal 200 is assumed to be on the ground surface, however, electric power is actually radiated spherically.

Here, an example of defining a Cumulative Distribution Function (CDF) for Equivalent Isotropic Radiated Power (EIRP) is described. For electric power spherically radiated from an antenna, a plurality of test points for measuring electric power is defined in a three-dimensional spherical shape centered on a terminal, and electric power at each test point is measured. A CDF can be obtained by plotting a ratio of achievable EIRP at each test point as a cumulative distribution.

As illustrated in FIG. 5, a maximum radiation in a main lobe of an antenna of the terminal 200 corresponds to peak EIRP. Namely, the peak EIRP can be achieved in a direction in which the antenna of the terminal 200 can achieve the maximum antenna gain. At this time, a distance from the dotted line indicated by isotropic antenna gain of 0 dBi to a tip of the main lobe corresponds to the antenna gain. For example, if transmission power at an end of an antenna connector is 20 dBm and peak EIRP is 30 dBm, the antenna gain for achieving the peak EIRP is 10 dB. If the terminal 200 does not achieve the peak EIRP, namely, if the user equipment is not transmitting toward boresight, the antenna gain is reduced to 7 dB, for example.

In the antenna of the terminal 200 illustrated in FIG. 5, EIRP to achieve the CDF of 50% is indicated by a dashed line of "CDF 50% EIRP." At this time, the antenna gain corresponds to the distance from the dotted line of isotropic antenna gain 0 dBi to the position at which the EIRP is achieved with which the CDF becomes 50%. For example, if the transmit power is 20 dBm at the end of the antenna connector and the EIRP to achieve the CDF of 50% is 24 dBm, the antenna gain is 4 dB.

Figure 6:
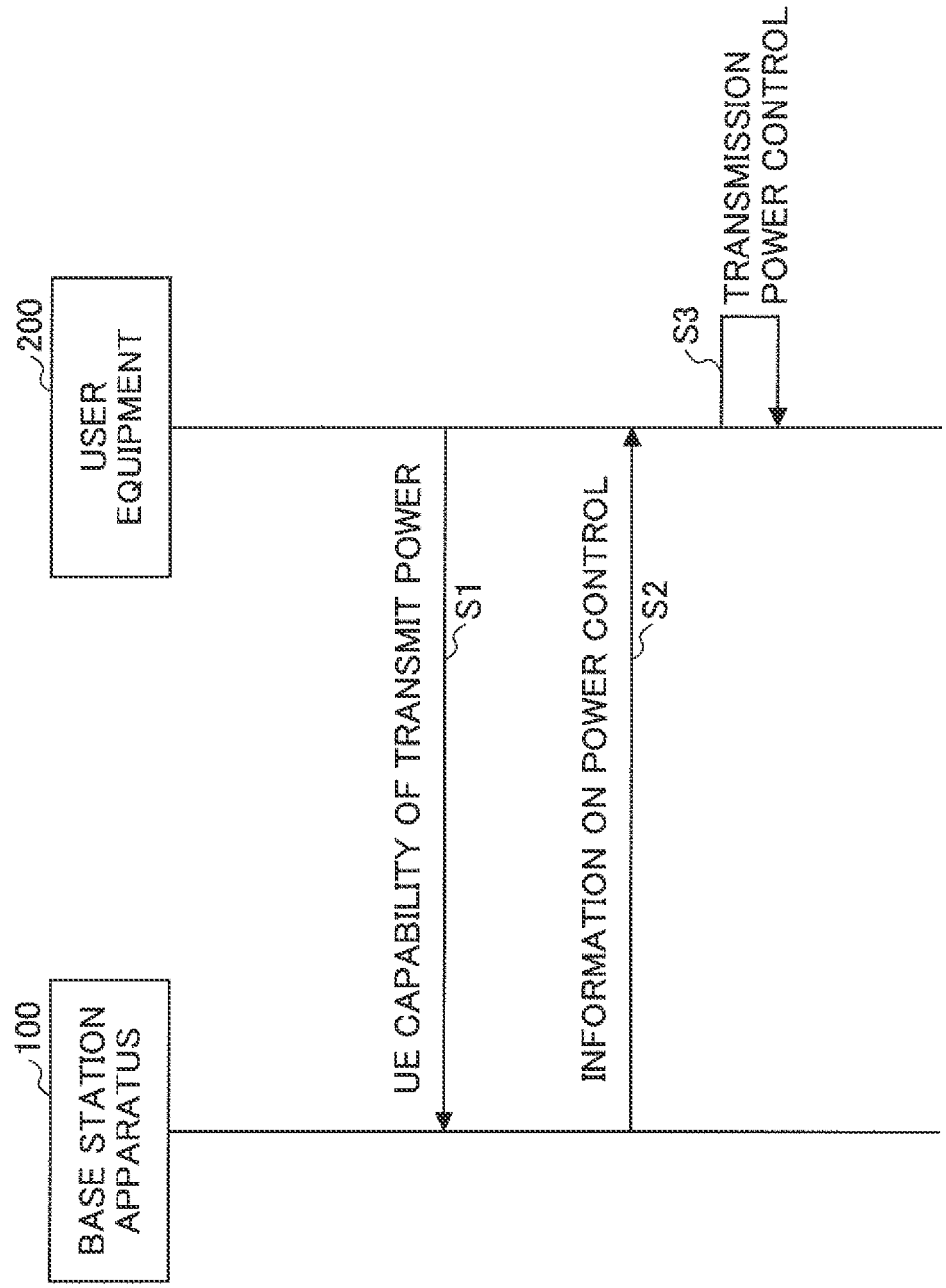
FIG. 6 is a sequence diagram illustrating a UE capability reporting procedure according to an embodiment of the present invention.
Figure 18:
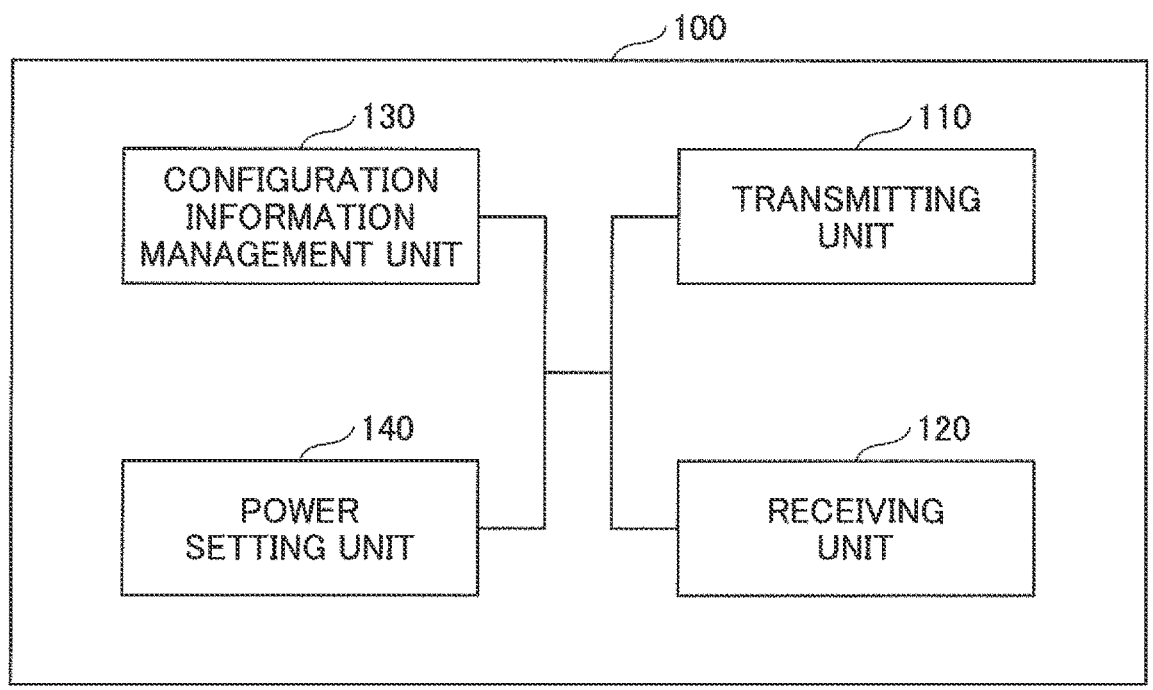
FIG. 18 is a diagram illustrating an example of a functional configuration of a base station apparatus 100 according to an embodiment of the present invention.
Figure 19:
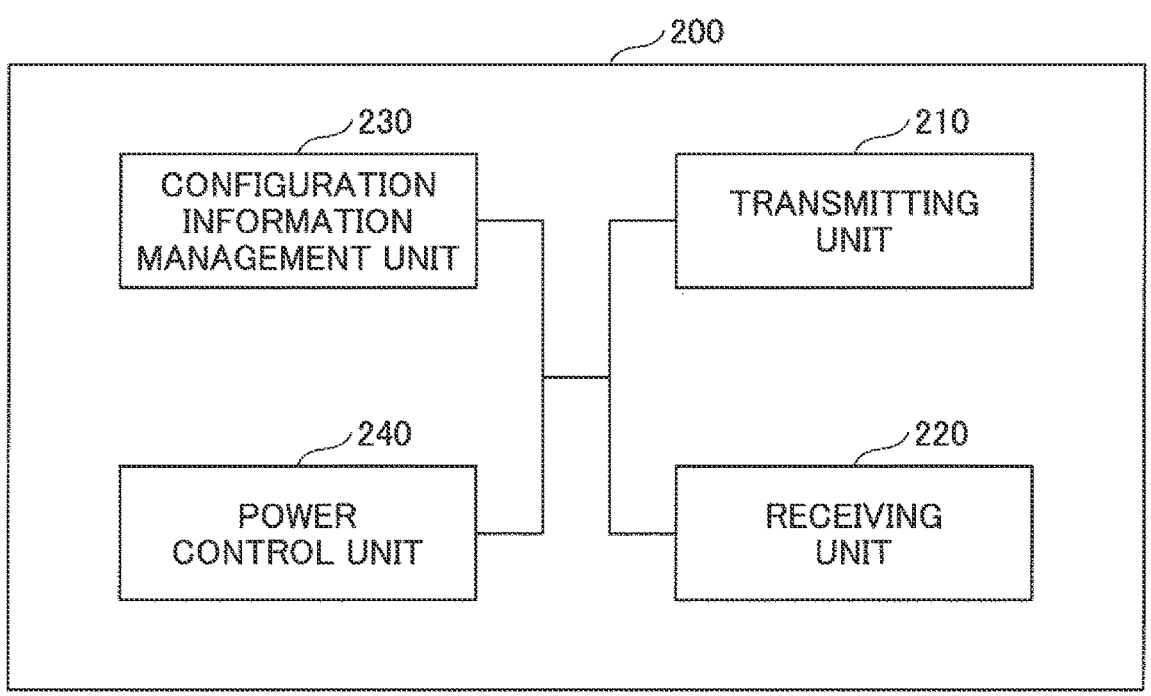
FIG. 19 is a diagram illustrating an example of a functional configuration of a terminal 200 according to an embodiment of the present invention.
Figure 20:
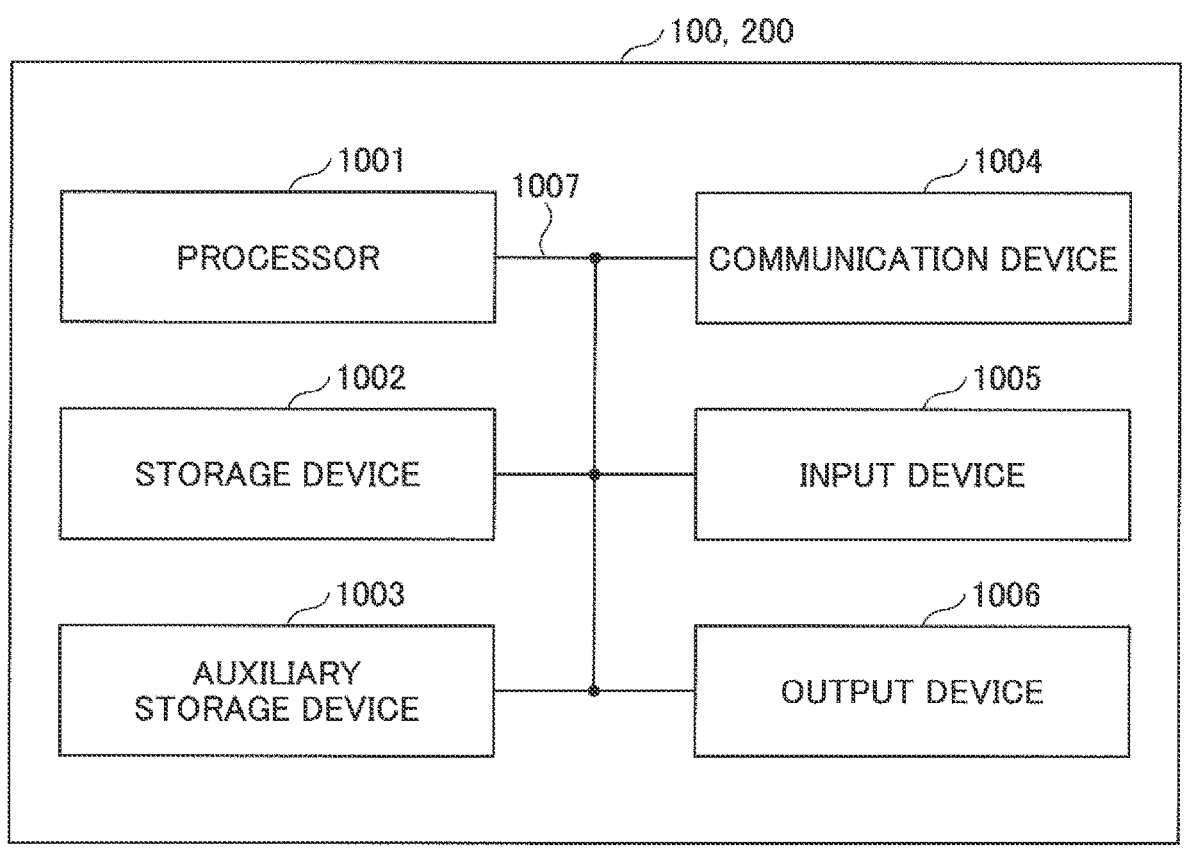
FIG. 20 is a diagram illustrating an example of hardware configurations of the base station apparatus 100 and the terminal 200 according to an embodiment of the present invention.

FIG. 6 is a sequence diagram illustrating a UE capability reporting procedure according to an embodiment of the present invention. In step S1, the terminal 200 transmits the UE capability related to the transmit power to the base station apparatus 100. The UE capability related to the transmit power includes information indicating a power class and spherical coverage. Spherical coverage is a spherical range defined by EIRP or CDF as described in FIG. 5.

In the NR, for example, the following four classes have been studied as the power classes included in the report of the UE capability.

1) FR1 UE power class
2) FR2 UE power class
3) FR1 UE power class for EN-DC
4) FR1 UE power class for NR CA The above-described Frequency Range (FR) indicates a frequency band. For example, FR1 may correspond to 450 MHz to 6000 MHz and FR2 may correspond to 24250 MHz to 52600 MHz. The above-described frequency is an example and the frequency defining the frequency band may be varied.

The above-described 1) FR1 UE power class has a feature related to RF characteristics, and is a power class defined for each band. The above-described 2) FR2 UE power class has a feature related to RF characteristics, and is a power class defined for each band. The above-described 3) FR1 UE power class for EN-DC has a feature related to RF characteristics and baseband processing, and is a power class defined for each band combination. EN-DC is a dual connectivity for communicating by Evolved Universal Terrestrial Radio Access (E-UTRA) and NR. The above-described 4) FR2 UE power class for NR CA has a feature related to RF characteristics and baseband processing, and is a power class defined for each band combination. NR CA is carrier aggregation (CA: Carrier Aggregation) in NR.

For example, a power class of EN-DC may be defined based on an LTE power class and an NR power class. For example, a maximum power class of an LTE power class and an NR power class may be defined as a power class of EN-DC. Alternatively, for example, a sum of an LTE power class and an NR power class may be defined as a lower class of EN-DC.

A power of EN-DC may be defined depending on implementation of a power amplifier and an RF circuit of the terminal 200. For example, if a power amplifier and an RF circuit are common to LTE and NR, a power class of EN-DC may be defined as a maximum power class of the LTE power class and the NR power class. Alternatively, for example, there are independent power amplifiers and RF circuits for LTE and NR, a sum of the LTE power class and the NR power class may be defined as a lower class of EN-DC.

An NR power class in FR1 may be defined in the same way as that of LTE. Namely, a default power class may be defined for each band. A default power class is a power class defined in advance. If the terminal 200 supports only the default power class, the UE capability signaling does not include the default power class, and the UE capability signaling only includes the corresponding frequency band. The UE capability signaling includes another power class only if the terminal 200 supports the default power and another power class.

Here, as for an NR power class in FR2, no default power class may be defined for each band, and a power class may be modified in accordance with an application or characteristics of the terminal 200. However, a detailed definition of a power class in FR2 has not been studied. In addition, a detailed definition of power class for NR CA or EN-DC has not been studied. In particular, when P_CMAX, which is the maximum transmit power of each Radio Access Technology (RAT), is regulated to be less than or equal to a power class by P_MAX, which is the maximum transmit power defined for each cell, P_CMAX for EN-DC is not defined.

In the following, a first reporting procedure for UE capability is described. Table 1 is an example of defining a default power class and spherical coverage, and an additional power class and spherical coverage, for each NR frequency band of FR2 for each terminal type.

TABLE 1

| Band number | UE types | Default PC/Spherical coverage | Additional PC/Spherical coverage |
|---|---|---|---|
| n256 | Mobile | 23 dBm/<br>20 dBm@20% tile | Not supported |
| n256 | Fixed | 26 dBm/<br>23 dBm@95% tile | 30 dBm/<br>27 dBm@95% tile |
| n257 | Mobile | 23 dBm/<br>20 dBm@20% tile | 26 dBm/<br>23 dBm@20% tile |
| n257 | fixed | 30 dBm/<br>27 dBm@95% tile | 33 dBm/<br>30 dBm@95% tile |

The "Band number" indicated in Table 1 identifies each band. The terminal type "UE types" includes "Mobile" representing a mobile terminal 200 and "Fixed" representing a fixed terminal 200. The terminal 200 reports UE capability to the base station apparatus 100 while including "Band number" corresponding to a connectable band and "UE types" in the UE capability.

The "Default PC/Spherical coverage" indicated in Table 1 is a default power class and spherical coverage, which are defined in advance for each band and terminal type, and need not be reported from the terminal 200 to the base station apparatus 100 as UE capability. The "Additional PC/Spherical coverage" indicated in Table 1 is a power class and spherical coverage that are added other than the default power class and spherical coverage, and is reported as UE capability from the terminal 200 to the base station apparatus 100.

The first example indicated in Table 1 is such that, when "Band number" is "n256" and "UE types" is "Mobile", the default power class is "23 dBm" and the spherical coverage is represented by EIRP 20 dBm and the CDF 20 percentile, and no additional power class and spherical coverage are supported. Here, the spherical coverage corresponding to the default power class may be represented by CDF 20 percentile, in the range from EIRP 20 dBm to 23 dBm.

The second example indicated in Table 1 is such that, when "Band number" is "n256" and "UE types" is "Fixed", the default power class is "26 dBm", the spherical coverage is represented by EIRP 23 dBm and CDF 95 percentile, and the additional power class is represented by "30 dBm" and the spherical coverage is represented by EIRP 27 dBm and CDF 95 percentile. Here, the spherical coverage corresponding to the default power class may be represented by CDF 95 percentile, in the range from EIRP 23 dBm to 26 dBm. The spherical coverage corresponding to the additional power class may be represented by CDF 95 percentile, in the range from EIRP 27 dBm to 30 dBm.

The third example indicated in Table 1 is such that, when "Band number" is "n257" and "UE types" is "Mobile", the default power class is "23 dBm", the spherical coverage is represented by EIRP 20 dBm and the CDF 20 percentile, an additional power class is "26 dBm" and the spherical coverage is represented by EIRP 23 dBm and CDF 20 percentile. Here, the spherical coverage corresponding to the default power class may be represented by CDF 20 percentile in the range from EIRP 20 dBm to 23 dBm, and the spherical coverage corresponding to the additional power class may be represented by CDF 20 percentile in the range from EIRP 23 dBm to 26 dBm.

The fourth example indicated in Table 1 is such that, when "Band number" is "n257" and "UE types" is "Mobile", the default power class is "30 dBm", the spherical coverage is represented by EIRP 27 dBm and CDF 95 percentile, and the additional power class is "33 dBm" and the spherical coverage is represented by EIRP 30 dBm and CDF 95 percentile. Here, the spherical coverage corresponding to the default power class may be represented by CDF 95 percentile in the range from EIRP 27 dBm to 30 dBm, and the spherical coverage corresponding to the additional power class may be represented by CDF 95 percentile in the range from EIRP 30 dBm to 33 dBm.

In the following, a second reporting procedure for UE capability is described. In the second reporting procedure, if the terminal 200 only supports the default power class, the UE capability signaling does not include the default power class, and the UE capability signaling only includes a corresponding frequency band. Only if the terminal 200 supports, in addition to the default power class, another power class, the other power class is included in the UE capability signaling.

Additionally, for each NR frequency band of FR2, a spherical coverage class, such as that illustrated in Table 2, is defined for each power class, and the terminal 200 includes the spherical coverage class in the UE capability signaling. Alternatively, the spherical coverage class may be defined in common to the plurality of power classes, and the spherical coverage class may be defined independently from the power class.

TABLE 2

| Spherical coverage class | EIRP [dBm] | CDF [%] |
| --- | --- | --- |
| 1 | 20 | 20 |
| 2 | 30 | 50 |
| 3 | 40 | 95 |

As illustrated in Table 2, the spherical coverage class "Spherical coverage class" is defined in EIRP and CDF. In the first example indicated in Table 2, the spherical coverage class "1" is defined as EIRP 20 dBm and CDF 20%. In the second example illustrated in Table 2, the spherical coverage class "2" is defined as EIRP 30 dBm and CDF 50%. In the third example illustrated in Table 2, the spherical coverage class "3" is defined as EIRP 40 dBm and CDF 95%.

The terminal 200 reports, to the base station apparatus 100, a spherical coverage class corresponding to the default power class and a supported frequency band number, while including the spherical coverage class and the supported frequency band number in UE capability. If a spherical coverage class is defined commonly among a plurality of power classes, or defined independently from a power class, the spherical coverage class may be reported to the base station apparatus 100 as the UE capability, independently from the default power class.

When the terminal 200 supports a power class other than the default power class, the terminal 200 reports, together with the supported frequency band number, a spherical power class corresponding to the supported power class to the base station apparatus 100, while including the spherical power class and the supported frequency number in the UE capability. If a spherical coverage class is defined commonly among a plurality of power classes or independently from the power class, the spherical coverage class may be reported to the base station apparatus 100 as UE capability, independently from the power class other than the default power class.

The spherical coverage class may be defined by EIRP and CDF as illustrated in Table 2, or it may be specified in EIRP only, or it may be specified in CDF only.

Table 3 is another example of defining a spherical coverage class.

TABLE 3

| Spherical coverage class | EIRP [dBm] | CDF [%] |
| --- | --- | --- |
| 1 | 20 | greater than or equal to 20 and less than 50 |
| 2 | 20 | greater than or equal to 50 |
| 3 | 30 | greater than or equal to 50 |
| 4 | 40 | greater than or equal to 95 |

As illustrated in Table 3, the spherical coverage class may be defined by EIRP and a predetermined range of CDF. In the first example indicated in Table 3, the spherical coverage class "1" is defined by EIRP 20 dBm and CDF that is greater than or equal to 20% and less than 50%. In the second example illustrated in Table 3, the spherical coverage class "2" is defined by EIRP 20 dBm and CDF that is greater than or equal to 50%. In the third example shown in Table 3, the spherical coverage class "3" is defined by EIRP 30 dBm and CDF that is greater than or equal to 50%. In the fourth example indicated in Table 3, the spherical coverage class "4" is defined by EIRP 40 dBm and CDF that is greater than or equal to 95%.

Table 4 is another example of defining a spherical coverage class.

TABLE 4

| Spherical coverage class | EIRP [dBm] | CDF [%] |
|---|---|---|
| 1 | greater than or equal to 20 | 20 |
| 2 | greater than or equal to 20 | 50 |
| 3 | greater than or equal to 30 | 50 |
| 4 | greater than or equal to 40 | 95 |

As illustrated in Table 4, the spherical coverage class may be defined in a predetermined range of EIRP and CDF. In the first example indicated in Table 4, the spherical coverage class "1" is defined by EIRP that is greater than or equal to 20 dBm and CDF 20%. In the second example indicated in Table 3, the spherical coverage class "2" is defined by EIRP that is greater than or equal to 20 dBm and CDF 50%. In the third example indicated in Table 3, the spherical coverage class "3" is defined by EIRP that is greater than or equal to 30 dBm and CDF 50%. In the fourth example indicated in Table 3, the spherical coverage class "4" is defined by EIRP that is greater than or equal to 40 dBm and CDF 95%.

In the following, a definition of a power class in NR CA is described. As for a power class in NR CA, a default power class may be defined for each NR CA band combination, separately from a case in which CA is not applied. If the terminal 200 only supports the default power class, the UE capability signaling does not include the corresponding power class, and the UE capability signaling only includes the corresponding band combination. Only if the terminal 200 supports, in addition to the default power class, another power class, the other power class is included in the UE capability signaling and reported to the base station apparatus 100. Note that, in NR CA, the frequency band included in FR1 and the frequency band included in FR2 may be used.

In the following, a definition of power class in EN-DC is described. Similar to the power class in NR CA described above, as for a power class in EN-DC, a default power class may be defined for each EN-DC band combination. If the terminal 200 supports only the default power class, the UE capability signaling does not include the default power class, and the UE capability signaling only includes the corresponding band combination. Only if terminal 200 supports, in addition to the default power class, another power class, the other power is reported to the base station apparatus 100, while included in the UE capability signaling.

A CA may be applied to the NR of the EN-DC band combination. The following 1) through 5) are examples of a definition of a power class in a EN-DC band combination. By defining a power class as in the following 1 through 5), desired transmission power control can be performed.

1) For each EN-DC band combination, a sum of a power class of an LTE frequency band and a power class of a NR CA band combination may be defined as a power class of the EN-DC band combination.
2) For each EN-DC band combination, the greater of a power class of an LTE frequency band and a sum of power classes of an NR CA band combination may be defined as the power of the EN-DC band combination.
3) For each EN-DC band combination, the smaller of a power class of an LTE frequency band and a power class of an NR CA band combination may be defined as the power of the EN-DC band combination.
4) For each EN-DC band combination, a maximum power class of a power class of an LTE frequency band and respective power classes of an NR CA band combination may be defined as the power of the EN-DC band combination.
5) For each EN-DC band combination, a minimum power class of a power class of an LTE frequency band and respective power classes of an NR CA band combination may be defined as the power across the EN-DC band combination.

Note that, for each EN-DC band combination, the base station apparatus 100 may report to the terminal 200 that which definition from the above-described 1) through 5) is used as a power class of an EN-DC band combination.

In the following, the definition of the maximum transmit power value P_CMAX in EN-DC is described. P_CMAX in LTE or NR may be calculated as follows.

$$P\_CMAX(LTE)=MIN(PowerClass\ LTE, P\_MAX(LTE))$$

$$P\_CMAX(NR)=MIN(PowerClass\ NR, P\_MAX(NR))$$

In addition, in EN-DC, the maximum transmit power allowed in a total cell group of Master Cell Group (MCG) and Secondary Cell Group (SCG) is newly defined as P_MAX (EN-DC). The P_MAX (EN-DC) may be individually indicated to the terminal 200 by Radio Resource Control (RRC) signaling.

P_CMAX in EN-DC may be calculated using P_MAX (EN-DC) as follows.

$$P\_CMAX(EN-DC)=MIN\{[P\_CMAX(LTE)+P\_CMAX(NR)], P\_MAX(EN-DC), PowerClass(EN-DC)\}$$

In step S2, the base station apparatus 100 transmits information on the power control to the terminal 200 based on the UE capability related to the transmit power received in step S1. The information relating to the power control includes, for example, a TPC command, a parameter for determining the maximum transmit power, or the like. Subsequently, at step S3, the terminal 200 performs transmission power control based on the information on the power control received at step S2. For example, the terminal 200 may obtain the P_MAX from the received information on the power control and calculate the P_CMAX, or it may obtain a TPC command from the received information on the power control and perform transmission power control.

FIG. 7 is an example (1) of a modification of a technical specification according to an embodiment of the present invention. FIG. 7 illustrates an example of a definition of a new power class. As illustrated in FIG. 7, it is an example in which spherical coverage is defined by a terminal type "UE type" and a power class "Power Class Min Peak EIRP" defined by the minimum peak EIRP. Note that, similar to Table 1, if the terminal 200 only supports the default power class, the UE capability signaling need not include the default power class.

In the first example indicated in FIG. 7, if the "NR band" identifying the band is "n257" and the "UE type" is "Handheld", the power class "Power Class Min Peak EIRP"

defined by the minimum peak EIRP is "[21.2-25.2]" and the corresponding spherical coverage is CDF 20 percentile and EIRP 18 dBm. Note that the "Power Class Min Peak EIRP" is a default power class with a maximum allowable EIRP of 43 dBm and a maximum transmit power of 23 dBm.

In the second example illustrated in FIG. 7, if the "NR band" identifying the band is "n257" and the "UE type" is "Handheld", the power class "Power Class Min Peak EIRP" defined by the minimum peak EIRP is "26" and the corresponding spherical coverage is CDF 20 percentile and EIRP is 21 dBm. The maximum allowable EIRP is 43 dBm and the maximum transmit power is 26 dBm.

In the third example shown in FIG. 7, if the "NR band" identifying the band is "n257" and the "UE type" is fixed wireless access "FWA", the power class "Power Class Min Peak EIRP" defined by the minimum peak EIRP is "36" and the corresponding spherical coverage is CDF 95 percentile and EIRP is 35 dBm. The "Power Class Min Peak EIRP" is the default power class with a maximum allowable EIRP of 55 dBm and a maximum transmit power of 26 dBm.

In the fourth example shown in FIG. 7, if "NR band" identifying a band is "n257" and "UE type" is "FWA", the power class "Power Class Min Peak EIRP" defined by the minimum peak EIRP is "26" and the corresponding spherical coverage is CDF 95 percentile and EIRP is 25 dBm. The maximum allowable EIRP is 43 dBm and the maximum transmit power is 23 dBm.

FIG. 8 is an example (2) of a modification of a technical specification according to an embodiment of the present invention. FIG. 8 illustrates an example of a definition of a new power class. As indicated in FIG. 8, the terminal type "UE type" and the power class "Power Class Min Peak EIRP" defined by the peak EIRP define the spherical coverage class, and spherical coverage class corresponding to the spherical coverage class is separately defined. As in Table 1, if the terminal 200 supports only the default power class, the UE capability signaling need not include the default power class.

In the first example illustrated in "NR FR2 UE Power Class" in FIG. 8, if the "NR band" identifying the band is "n257", the power class "Power Class Min Peak EIRP" defined by the minimum peak EIRP is "[21.2-25.2]" and the corresponding spherical coverage class is "1." The maximum allowable EIRP is 43 dBm and the maximum transmit power is 23 dBm.

In the second example illustrated in "NR FR2 UE Power Class" in FIG. 8, if the "NR band" identifying the band is "n257", the power class "Power Class Min Peak EIRP" defined by the minimum peak EIRP is "[36.0]" and the corresponding spherical coverage class is "2." The maximum allowable EIRP is 43 dBm and the maximum transmit power is 23 dBm.

In the third example illustrated in "NR FR2 UE Power Class" in FIG. 8, if the "NR band" identifying the band is "n257", the power class "Power Class Min Peak EIRP" defined by the minimum peak EIRP is "[36.0]" and the corresponding spherical coverage class is "3." The maximum allowable EIRP is 55 dBm and the maximum transmit power is 26 dBm.

In "NR FR2 UE Spherical Class" in FIG. 8, the spherical coverage class "1" indicates that CDF of the spherical coverage is 20 percentile and EIRP is 15 dBm. The spherical coverage class "2" indicates that CDF of the spherical coverage is 50 percentile and EIRP is 25 dBm. The spherical coverage class "3" indicates that CDF of the spherical coverage is 95 percentile and EIRP is 35 dBm.

FIG. 9 is an example (3) of a modification of a technical specification according to an embodiment of the present invention. As indicated in FIG. 9, the $P_{EMAX,\ MR-DC}$, which is the maximum transmit power specified in the MR-DC (Multi RAT DC), is signaled to the terminal 200 via the higher layer. Here MR-DC may refer to EN-DC.

As indicated in FIG. 9, the default power class $P_{PowerClass\_Default}$, EN-DC at the time of EN-DC may be the power class 3, unless otherwise specified.

As indicated in FIG. 9, the maximum transmit power PCMAX is calculated based on the default power class $P_{PowerClass\_Default}$, EN-DC during EN-DC and $P_{EMAX,\ MR-DC}$ As illustrated in FIG. 9, when the terminal 200 supports a higher power class than the default power class, when $P_{EMAX,\ MR-DC}$ is not reported, or when $P_{EMAX,\ MR-DC}$ is reported and the maximum transmit power is less than or equal to the default power class, the $\Delta P_{PowerClass,\ EN-DC}$ is defined by $P_{PowerClass,\ EN-DC} - P_{PowerClass\_Default}$, EN-DC, and otherwise $\Delta P_{PowerClass,\ EN-DC}$ is 0.

In the above-described embodiment, the base station apparatus 100 and the terminal 200 may report, to the base station apparatus 100, the default power class or power class, which is associated with the frequency band and the terminal type, and the spherical coverage class, as UE capability. The base station apparatus 100 and the terminal 200 may also perform transmission power control based on the default power class or the power class and the spherical coverage class. The base station apparatus 100 and the terminal 200 may also define the maximum transmit power in EN-DC based on the maximum transmit power of each RAT of the LTE or NR.

Namely, in the radio communication system, the user equipment can perform appropriate transmission power control.

As described above, P_MAX is the maximum transmit power specified for each cell. Introduction of P_MAX in FR2 is currently being studied in a 3GPP meeting. In 3GPP Release 15, it is assumed that P_MAX will not be introduced in FR2. In contrast to this, there is a possibility that P_MAX will be introduced in FR2 in 3GPP release 16.

Suppose that P_MAX is introduced in FR2 in 3GPP Release 16. Additionally, suppose that P_MAX is not introduced in FR2 in 3GPP Release 15. In this case, for example, the terminal 200 that supports Release 16 may configure the maximum transmit power defined on an FR2 cell based on P_MAX in FR2 provided by the base station 100. However, if the terminal 200 supports the functions of Release 15 and does not support the functions of Release 16, even if P_MAX in FR2 is provided by the base station 100, since it is assumed in the functions of Release 15 that P_MAX in FR2 is not provided, the terminal 200 may be unable to appropriately configure the maximum transmit power on an FR2 cell, based on P_MAX that is provided in FR2. Note that, in the above-described example, 3GPP Release 15 and Release 16 are assumed. However, applicable technical specifications are not limited to this example. In accordance with update of a technical specification, if, in an old technical specification, P_MAX is not provided in FR2, while, in an updated technical specification, P_MAX is provided in FR2, a problem similar to the above-described example may occur.

Accordingly, there is a need for a method that allows a terminal to properly operate when P_MAX is not introduced in FR2 in an old technical specification and P_MAX is introduced in FR2 in an updated technical specification in accordance with update of the technical specification, and when P_MAX in FR2 is indicated to the terminal 200 that supports a function of the old technical specification and that does not support a function of the updated technical specification.

(Alt1)

System Information Block2 (SIB2) includes cell reselection information and intra-frequency cell reselection information. For example, it may be specified in an old technical specification that, if SIB2 includes P_MAX on an FR2 cell, the terminal 200 ignores the P_MAX field on the FR2 cell, considers that P_MAX on the FR2 cell is not included, and applies the maximum transmit power specified in the technical specification.

System Information Block4 (SIB4) includes information on cell reselection between different frequencies. For example, it may be specified in an old technical specification that, if SIB4 includes P_MAX on an FR2 cell, the terminal 200 ignores the P_MAX field on the FR2 cell, considers that P_MAX on the FR2 cell is not included, and applies the maximum transmit power specified in the technical specification.

The information element FrequencyInfoUL-SIB includes basic parameters of an uplink carrier and transmission in an uplink carrier. For example, it may be specified in an old technical specification that, if FrequencyInfoUL-SIB includes P_MAX on an FR2 cell, the terminal 200 ignores the P_MAX field on the FR2 cell, considers that P_MAX on the FR2 cell is not included, and applies the maximum transmit power specified in the technical specification.

Furthermore, the technical specification of P_MAX, which is the maximum transmit power specified for each cell, may be changed. For example, it may be specified in an old technical specification that, if P_MAX on an FR2 cell is present, the terminal 200 ignores the P_MAX field on the FR2 cell, considers that P_MAX for the cell in FR2 is not included, and applies the maximum transmit power specified in the technical specification.

FIG. 10 is a diagram illustrating an example (4) of a modification of a technical specification according to an embodiment of the present invention. As illustrated in the example of FIG. 10, it may be specified in an old technical specification that, if SIB2 includes P_MAX on an FR2 cell, the terminal 200 ignores the P_MAX field, considers that P_MAX is absent, and applies the maximum transmit power specified in the technical specification; namely, it may be specified that the terminal applies the maximum transmit power defined for a supported power class for a frequency band of the cell.

FIG. 11 is an example (5) of a modification of a technical specification according to an embodiment of the present invention. As illustrated in the example of FIG. 11, it may be specified in an old technical specification that, if SIB4 includes P_MAX on an FR2 cell, the terminal 200 ignores the P_MAX field, considers that P_MAX is absent, and applies the maximum transmit power specified in the technical specification; namely, it may be specified that the terminal applies the maximum transmit power defined for a supported power class for a frequency band of the cell.

FIG. 12 is a diagram illustrating an example (6) of a modification of a technical specification according to an embodiment of the present invention. As illustrated in the example in FIG. 12, it may be specified in an old technical specification that, if FrequencyInfoUL-SIB includes P_MAX on an FR2 cell, the terminal 200 ignores the P_MAX field, considers that P_MAX is absent, and applies the maximum transmit power specified in the technical specification; namely, it may be specified that the terminal applies the maximum transmit power defined for a supported power class for a frequency band of the cell.

FIG. 13 is a diagram illustrating an example (7) of a modification of a technical specification according to an embodiment of the present invention. As illustrated in the example of FIG. 13, it may be specified in an old technical specification that, if P_MAX is present on an FR2 cell, the terminal 200 ignores the P_MAX field, considers that P_MAX is absent, and applies the maximum transmit power specified in the technical specification; namely, it may be specified that the terminal applies the maximum transmit power defined for a supported power class for a frequency band of the cell.

As described above, according to the method of Alt1, when P_MAX is not introduced in FR2 in an old technical specification and P_MAX is introduced in FR2 in an updated technical specification, when P_MAX in FR2 is indicated to the terminal 200 that supports a function of the old technical specification and that does not support a function of the updated technical specification, the terminal 200 can properly operate.

(Alt2)

For example, it may be specified in an old technical specification that, if SIB2 includes P_MAX on an FR2 cell, the terminal 200 shall consider the FR2 cell as barred.

For example, it may be specified in an old technical specification that, if SIB4 includes P_MAX on an FR2 cell, the terminal 200 shall consider the FR2 cell as barred.

For example, it may be specified in an old technical specification that, if FrequencyInfoUL-SIB includes P_MAX on an FR2 cell, the terminal 200 shall consider the FR2 cell as barred.

For example, it may be specified in an old technical specification that, if P_MAX on an FR2 cell is present, the terminal 200 shall consider the FR2 cell as barred.

FIG. 14 is an example (8) of a modification of a technical specification according to an embodiment of the present invention. As illustrated in the example of FIG. 14, it may be specified in an old technical specification that, if SIB2 includes P_MAX on an FR2 cell, the terminal 200 shall consider the FR2 cell as barred.

FIG. 15 is an example (9) of a modification of a technical specification according to an embodiment of the present invention. As illustrated in the example of FIG. 15, it may be specified in an old technical specification that, if SIB4 includes P_MAX on an FR2 cell, the terminal 200 shall consider the FR2 cell as barred.

FIG. 16 is an example (10) of a modification of a technical specification according to an embodiment of the present invention. As illustrated in the example of FIG. 16, it may be specified in an old technical specification that, if FrequencyInfoUL-SIB includes P_MAX on an FR2 cell, the terminal 200 shall consider the FR2 cell as barred.

FIG. 17 is an example (11) of a modification of a technical specification according to an embodiment of the present invention. As illustrated in the example of FIG. 17, it may be specified in an old technical specification that, if P_MAX is present on an FR2 cell, the terminal 200 shall consider the FR2 cell as barred.

As described above, according to the method of Alt2, when P_MAX is not introduced in FR2 in an old technical specification and P_MAX is introduced in FR2 in an updated technical specification, when P_MAX in FR2 is indicated to the terminal 200 that supports a function of the old technical specification and that does not support a function of the updated technical specification, the terminal 200 can properly operate.

(Device Configuration)

Next, examples of functional configurations of the base station apparatus 100 and the terminal 200, which perform the process and the operation described above, are described. Each of the base station apparatus 100 and the terminal 200 includes a function for implementing at least the embodiments. However, each of the base station apparatus 100 and the terminal 200 may only include a part of the functions of the embodiments.

FIG. 10 is a diagram illustrating an example of a functional configuration of the base station apparatus 100. As illustrated in FIG. 10, the base station apparatus 100 includes a transmitting unit 110; a receiving unit 120; a configuration information management unit 130; and a power setting unit 140. The functional configuration illustrated in FIG. 10 is merely an example. The functional division and names of the functional units may be any division and names, provided that the operation according to the embodiments of the present invention can be executed.

The transmitting unit 110 includes a function for generating signals to be transmitted to the terminal 200 and for wirelessly transmitting the signals. The receiving unit 120 includes a function for receiving various types of signals including NR-PUSCH transmitted from the terminal 200 and for retrieving, for example, higher layer information from the received signals. Additionally, the receiving unit 120 demodulates NR-PUSCH based on PT-RS received from the terminal 200. Additionally, the transmitting unit 110 is provided with a function for transmitting, to the terminal 200, NR-PSS, NR-SSS, NR-PBCH, NR-PDCCH, NR-PDSCH, or the like. Additionally, the transmitting unit 110 transmits, to the terminal 200, various types of reference signals, such as DM-RS.

The configuration information management unit 130 stores preconfigured configuration information and various types of configuration information to be transmitted to the terminal 200. Content of the configuration information is, for example, information or the like related to the transmission power control of the terminal 200.

As described in the embodiment, the power setting unit 140 transmits information related to the power control from the base station apparatus 100 to the terminal 200. The transmitting unit 110 may include a functional unit related to transmission to the terminal 200 in the power setting unit 140, and a functional unit related to reception from the terminal 200 in the power setting unit 140 may be included in the receiving unit 120.

FIG. 11 is a diagram illustrating an example of a functional configuration of the terminal 200. As shown in FIG. 11, the terminal 200 includes a transmitting unit 210, a receiving unit 220, a configuration information management unit 230, and a power control unit 240. The functional configuration shown in FIG. 11 is only one example. If the operation according to the embodiments of the present invention can be performed, the functional division and the name of the functional units may be any division and names.

The transmitting unit 210 creates a transmission signal from the transmission data and wirelessly transmits the transmission signal. The transmitting unit 210 transmits a signal including various reference signals to the base station apparatus 100, for example, PT-RS and NR-PUSCH corresponding to said PT-RS. The receiving unit 220 receives various signals wirelessly and acquires signals from higher layers from the received signal of the physical layer. The receiving unit 220 has a function to receive NR-PSS, NR-SSS, NR-PBCH, NR-PDCH, NR-PDCCH, or NR-PDSCH transmitted from the base station apparatus 100. The transmitting unit 210 transmits an uplink signal to the base station apparatus 100, and the receiving unit 220 receives various reference signals, for example, DM-RS, PT-RS, or the like, from the base station apparatus 100. The configuration information management unit 230 stores various setting information received from the base station apparatus 100 by the receiving unit 220. The configuration information management unit 230 also stores the preset configuration information. The contents of the configuration information are, for example, information related the transmission power control of the terminal 200.

The power control unit 240 transmits the UE capability related to the transmit power to the base station apparatus 100 as described in the embodiment. The power control unit 240 performs transmission power control based on the information related to the power control received from the base station apparatus 100. A function unit related to transmission to the base station apparatus 100 in the power control unit 240 may be included in the transmitting unit 210, and a function unit related to reception from the base station apparatus 100 in the power control unit 240 may be included in the receiving unit 220.

(Hardware Configuration)

The functional configuration diagrams (FIG. 10 and FIG. 11) used for describing the above-described embodiments of the present invention show blocks of functional units. These functional blocks (components) are implemented by any combination of hardware and/or software. Additionally, means for implementing each functional block is not particularly limited. Namely, each functional block may be implemented by a single device in which a plurality of elements is physically and/or logically coupled, or each functional block may be implemented by a plurality of devices, while directly and/or indirectly (e.g., wired and/or wireless) connecting two or more devices that are physically and/or logically separated.

For example, each of the base station apparatus 100 and the terminal 200 in the embodiments of the present invention may function as a computer that performs processing according to the embodiments of the present invention. FIG. 12 is a diagram illustrating an example of a hardware configuration of a radio communication device, which may be the base station apparatus 100 or the terminal 200 according to the embodiments of the present invention. Each of the above-described base station apparatus 100 and the terminal 200 may be physically configured as a computer device including a processor 1001; a storage device 1002; an auxiliary storage device 1003; a communication device 1004; an input device 1005; an output device 1006; a bus 1007, and the like.

Note that, in the following description, the term "apparatus" can be replaced with a circuit, a device, a unit, or the like. The hardware configuration of each of the base station apparatus 100 and the terminal 200 may be configured to include one or more of the respective devices indicated by 1001 through 1006 in the figure, or may be configured not to include a part of the devices.

Each function of the base station apparatus 100 and the terminal 200 is implemented by loading predetermined software (program) on hardware, such as the processor 1001 and the storage device 1002, so that the processor 1001 performs computation and controls communication by the communication device 1004, and reading and/or writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, and the like.

Additionally, the processor 1001 reads a program (program code), a software module and data from the auxiliary storage device 1003 and/or the communication device 1004 to the storage device 1002, and executes various processes according to these. As the program, a program is used which causes a computer to execute at least a part of the operations described in the above-described embodiment. For example, the transmitting unit 110, the receiving unit 120, the configuration information management unit 130, and the power setting unit 140 of the base station apparatus 100 illustrated in FIG. 10 may be implemented by a control program stored in the storage device 1002 and executed by the processor 1001. Furthermore, for example, the transmitting unit 210, the receiving unit 220, the configuration information management unit 230, and the power control unit 240 of the terminal 200 illustrated in FIG. 11 may be implemented by a control program stored in the storage device 1002 and executed by the processor 1001. Although it is described that the above-described various processes are executed by a single processor 1001, the above-described various processes may be simultaneously or sequentially executed by two or more processors 1001. The processor 1001 may be implemented by one or more chips. Note that the program may be transmitted from a network via an electric communication line.

The storage device 1002 is a computer readable recording medium, and the storage device 1002 may be formed of at least one of a read-only memory (ROM), an erasable programmable ROM (EPROM), an electrically erasable programmable ROM (EEPROM), a random access memory (RAM), and the like. The storage device 1002 may be referred to as a register, a cache, a main memory (main storage device), or the like. The storage device 1002 can store programs (program codes), software modules, or the like, that can be executed to perform the process according to the embodiments of the present invention.

The auxiliary storage device 1003 is a computer readable recording medium, and, for example, the auxiliary storage device 1003 may be formed of at least one of an optical disk such as a Compact Disc ROM (CD-ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, and the like. The auxiliary storage device 1003 may be referred to as an auxiliary storage device. The above-described storage medium may be, for example, a database including the storage device 1002 and/or the auxiliary storage device 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, or the like. For example, the transmitting unit 110 and the receiving unit 120 of the base station apparatus 100 may be implemented by the communication device 1004. Additionally, the transmitting unit 210 and the receiving unit 220 of the terminal 200 may be implemented by the communication device 1004.

The input device 1005 is an input device (e.g., a keyboard, a mouse, a microphone, a switch, a button, and a sensor) for receiving an input from outside. The output device 1006 is an output device (e.g., display, speaker, and LED lamp) that performs output toward outside. Note that the input device 1005 and the output device 1006 may be integrated (for example, a touch panel).

Furthermore, the devices, such as the processor 1001 and the storage device 1002, are connected by a bus 1007 for communicating information. The bus 1007 may be formed of a single bus, or the bus 1007 may be formed of buses that are different among the devices.

Furthermore, each of the base station apparatus 100 and the user equipment 200 may be configured to include hardware, such as a microprocessor, a digital signal processor (DSP: Digital Signal Processor), an Application Specific Integrated Circuit (ASIC), a Programmable Logic Device (PLD), a Field Programmable Gate Array (FPGA), and the like, and a part or all of the functional blocks may be implemented by the hardware. For example, the processor 1001 may be implemented by at least one of these hardware components.

Conclusion of the Embodiments

In this specification, at least the following terminal and communication method are disclosed.

A terminal including a receiving unit that receives P-Max that is configuration information of maximum transmit power in a cell in Frequency Range 2 (FR2) among Frequency Range 1 (FR1) and the FR2; and a control unit that performs, when the P-Max of the cell in the FR2 is not supported, an operation of ignoring the P-Max of the cell in the FR2 or an operation of considering the cell in the FR2 as a barred cell.

According to the above-described configuration, a terminal can properly operate when P_MAX is not introduced in FR2 in an old technical specification and P_MAX is introduced in FR2 in an updated technical specification in accordance with update of the technical specification, and when P_MAX in FR2 is indicated to the terminal that supports a function of the old technical specification and that does not support a function of the updated technical specification. According to the embodiments, there is provided a terminal including a receiving unit that receives P-Max that is configuration information of maximum transmit power in a cell in a Frequency Range 2 (FR2) among Frequency Range 1 (FR1) and the FR2; and a control unit that performs, when the P-Max of the FR2 cell is not supported, an operation of ignoring the P-Max of the FR2 cell. Furthermore, according to the embodiments, there is provided a terminal including a receiving unit that receives P-Max that is configuration information of maximum transmit power in a cell in a Frequency Range 2 (FR2) among Frequency Range 1 (FR1) and the FR2; and a control unit that performs, when the P-Max of the FR2 cell is not supported, an operation of considering the FR2 cell as a barred cell.

The P-Max may be included in at least one of System Information Block2 (SIB2), System Information Block4 (SIB4), or FrequencyInfoUL-SIB in System Information Block 1 (SIB1).

When the control unit ignores the P-Max on the cell in the FR2, the control unit may configure, as the maximum transmit power in the cell in the FR2, default maximum transmit power for the FR2 that is defined as a Power class.

When the control unit considers the cell in the FR2 as the barred cell, the control unit may select a cell in the FR1.

A communication method by a terminal, the communication method including a step of receiving P-Max that is configuration information of maximum transmit power in a cell in Frequency Range 2 (FR2) among Frequency Range 1 (FR1) and the FR2; and a step of performing, when the P-Max of the cell in the FR2 is not supported, an operation of ignoring the P-Max of the cell in the FR2 or an operation of considering the cell in the FR2 as a barred cell.

According to the above-described configuration, a terminal can properly operate when P_MAX is not introduced in FR2 in an old technical specification and P_MAX is introduced in FR2 in an updated technical specification in accordance with update of the technical specification, and when P_MAX in FR2 is indicated to the terminal that supports a function of the old technical specification and that does not support a function of the updated technical specification.

Supplemental Embodiments

The embodiments of the present invention are described above. However, the disclosed invention is not limited to the above-described embodiments, and those skilled in the art would appreciate various modified examples, revised examples, alternative examples, substitution examples, and so forth. In order to facilitate understanding of the invention, specific numerical value examples are used for description. However, the numerical values are merely examples, and any suitable values may be used unless as otherwise specified. The classification of items in the above description is not essential to the present invention. Matter described in two or more items may be combined and used as necessary, and matter described in one item may be applied to matter described in another item (provided that they do not contradict). The boundary between functional units or processing units in a functional block diagram does not necessarily correspond to the boundary between physical components. Operations of a plurality of functional units may be performed physically by one component, or an operation of one functional unit may be physically performed by a plurality of parts. The order of the procedures described in the embodiments may be changed, provided that they do not contradict. For the sake of convenience of processing description, the base station apparatus 100 and the terminal 200 are described using the functional block diagrams. However, such devices may be implemented by hardware, software, or a combination thereof. Each of software executed by the processor included in the base station apparatus 100 according to the embodiments of the present invention and software executed by the processor included in the terminal 200 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited to the aspects/embodiments described in the present specification and may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LIE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems extended on the basis of these systems.

In processing procedures, sequences, flowcharts, or the like, of each embodiment/modified example described in the specification, the order may be changed provided that there is no contradiction. For example, for the methods described in the specification, the elements of the various steps are presented in an exemplary order and are not limited to a specific order presented.

The specific operations that are described in the specification to be performed by the base station apparatus 100 may be performed by their upper nodes in some cases. In a network formed of one or more network nodes including the base station apparatus 100, it is apparent that the various operations performed for communication with the user equipment 200 may be performed by the base station apparatus 100 and/or a network node other than the base station apparatus 100 (e.g., MME or S-GW can be considered, however, not limited to these). In the above description, a case is exemplified in which there is one network node other than the base station apparatus 100. However, it can be a combination of other network nodes (e.g., MME and S-GW).

Each aspect/embodiment described in this specification may be used alone, may be used in combination, or may be used while being switched during the execution.

The terminal 200 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

The base station apparatus 100 may be referred to, by a person ordinarily skilled in the art, as a NodeB (NB), an enhanced NodeB (eNB), gNB, a base station (Base Station), or any other suitable terms.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "based on" used in the present specification does not mean "based on only" unless as otherwise specified explicitly. In other words, the expression "based on" means both "based on only" and "based on at least."

As long as "include," "including," and variations thereof are used in this specification or the claims, the terms are intended to be inclusive in a manner similar to the term "comprising." Furthermore, the term "or" used in the specification or claims is intended not to be an exclusive OR.

In the whole of the present disclosure, for example, if articles are added by translation, such as "a," "an," and "the," these articles may include a plural forms, unless as otherwise indicated explicitly by the context.

In the embodiment of the present invention, the power control unit 240 is an example of the control unit. The power setting unit 140 is an example of a setting unit. The transmitting unit 210 is an example of a notification unit or a transmission unit. The receiving unit 120 is an example of the acquiring unit or the receiving unit. "Band number" is an example of information representing frequency bands. "UE types" is an example of information indicating the type of user device. LTE is an example of the first RAT. NR is an example of a second RAT.

While the present invention is described in detail above, those skilled in the art will appreciate that the present invention is not limited to the embodiments described in the specification. The invention may be practiced as modifications and variations without departing from the gist and scope of the invention as defined by the appended claims. Accordingly, the description in the specification is for purposes of illustration and is not intended to have any limiting meaning with respect to the present invention.

LIST OF REFERENCE SYMBOLS 100 base station apparatus
200 terminal
110 transmitting unit
120 receiving unit
130 configuration information management unit
140 power setting section
200 user equipment
210 transmitting unit
220 receiving unit
230 configuration information management unit
240 power control unit
1001 processor
1002 storage device
1003 auxiliary storage device
1004 communication device
1005 input device
1006 output device

The invention claimed is:

1. A terminal comprising:
a receiver that receives configuration information for maximum transmit power of a cell in a Frequency Range 2 (FR2) among a Frequency Range 1 (FR1) and the FR2, wherein the FR1 is a first frequency band and the FR2 is a second frequency band; and
a processor that ignores the configuration information of the cell in the FR2,
wherein, when the processor ignores the configuration information of the cell in the FR2, the processor configures, as the maximum transmit power in the cell in the FR2, maximum transmit power for the FR2 that is defined for each Power class.

2. The terminal according to claim 1, wherein the configuration information is included in at least one of System Information Block2 (SIB2), System Information Block4 (SIB4), or FrequencyInfoUL-SIB in System Information Block 1 (SIB1).

3. The terminal according to claim 1, wherein, when the processor ignores the configuration information of the cell in the FR2, the processor configures, as the maximum transmit power in the cell in the FR2, maximum transmit power for the FR2 that is defined for each Power class.

4. The terminal according to claim 1, wherein, when the configuration information of the cell in the FR2 is not supported, the processor ignores the configuration information of the cell in the FR2.

5. A communication method executed by a terminal, the communication method comprising:
receiving configuration information for maximum transmit power of a cell in a Frequency Range 2 (FR2) among a Frequency Range 1 (FR1) and the FR2, wherein the FR1 is a first frequency band and the FR2 is a second frequency band; and
ignoring the configuration information of the cell in the FR2,
wherein, when the terminal ignores the configuration information of the cell in the FR2, the terminal configures, as the maximum transmit power in the cell in the FR2, maximum transmit power for the FR2 that is defined for each Power class.

6. A radio communication system comprising:
a terminal; and
a base station,
wherein the terminal includes
a receiver that receives configuration information for maximum transmit power of a cell in a Frequency Range 2 (FR2) among a Frequency Range 1 (FR1) and the FR2, wherein the FRI is a first frequency band and the FR2 is a second frequency band; and
a processor that ignores the configuration information of the cell in the FR2,
wherein, when the processor ignores the configuration information of the cell in the FR2, the processor configures, as the maximum transmit power in the cell in the FR2, maximum transmit power for the FR2 that is defined for each Power class, and
wherein the base station includes a transmitter that transmits the configuration information.

* * * * *